Oct. 19, 1965     E. A. HEDIGER     3,212,362

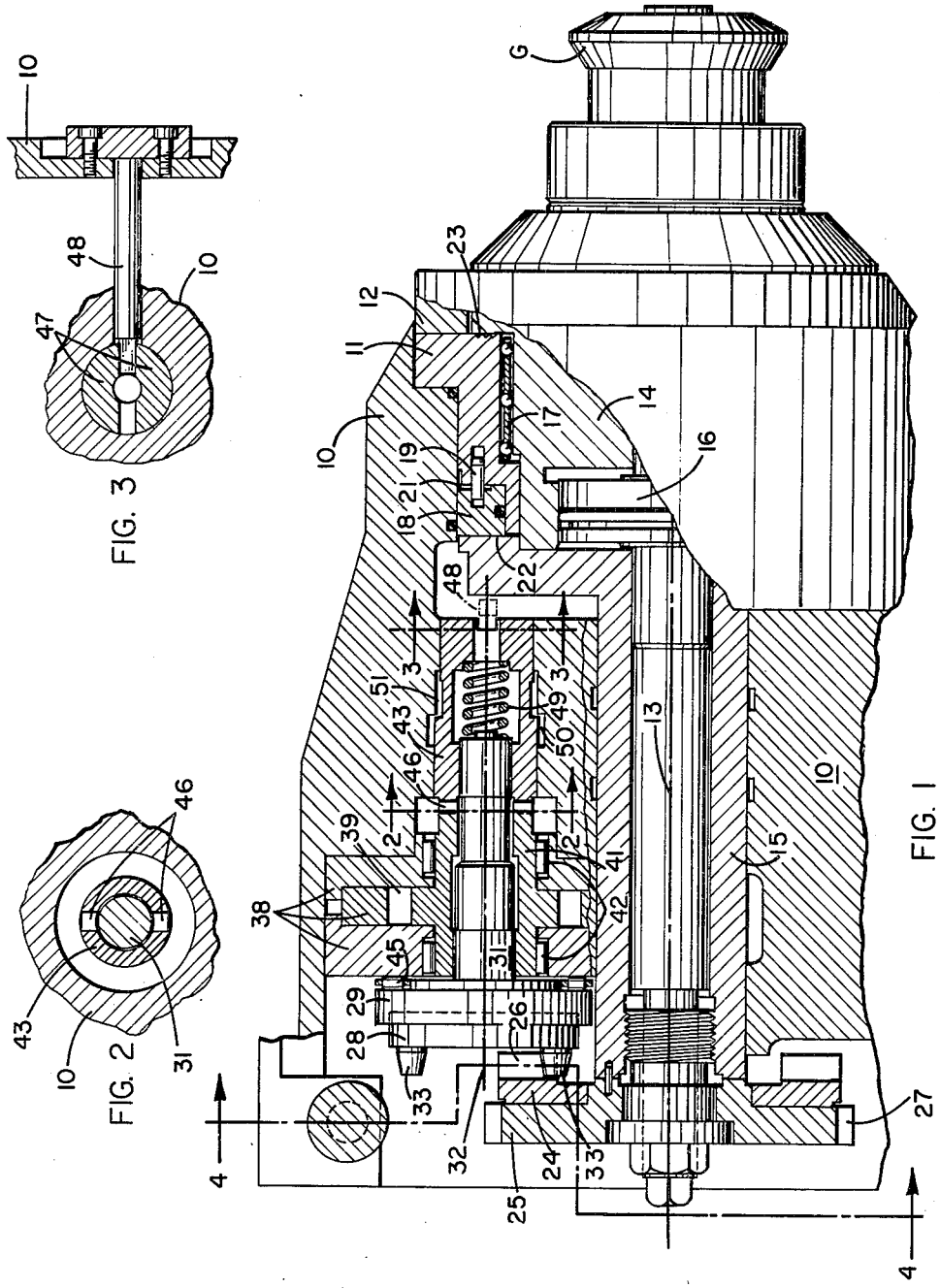

INDEX MECHANISM

Filed March 11, 1963     2 Sheets-Sheet 2

United States Patent Office 3,212,362
Patented Oct. 19, 1965

3,212,362
INDEX MECHANISM
Edwin A. Hediger, Fairport, N.Y., assignor to The Gleason Works, Rochester, N.Y., a corporation of New York
Filed Mar. 11, 1963, Ser. No. 264,155
5 Claims. (Cl. 74—820)

The present invention relates to an intermittent index mechanism for machine tools, for example for the work spindles of gear cutting machines.

The object of the invention is a simple and rugged mechanism capable of accurate indexing at very high speed without excessive acceleration loads. The mechanism comprises a housing rotatably supporting a Geneva driver and radially slotted driven wheel, the driver having two diametrically opposed drive pins for alternate engagement in the wheel slots, a fluid pressure operable actuator for the driver including a member rotatable back and forth in the housing through 180° about the axis of the driver, a shuttle rotatable with the driver and reciprocable thereon along said axis by fluid pressure, the shuttle having teeth thereon for coupling it, when in its terminal positions of reciprocation, respectively to said member and to the housing. Valve means are provided to cause the strokes of back and forth rotation of said member to alternate with the strokes of reciprocation of the shuttle to thereby effect intermittent unidirectional rotation of the driver through increments of 180°.

Figure 4:
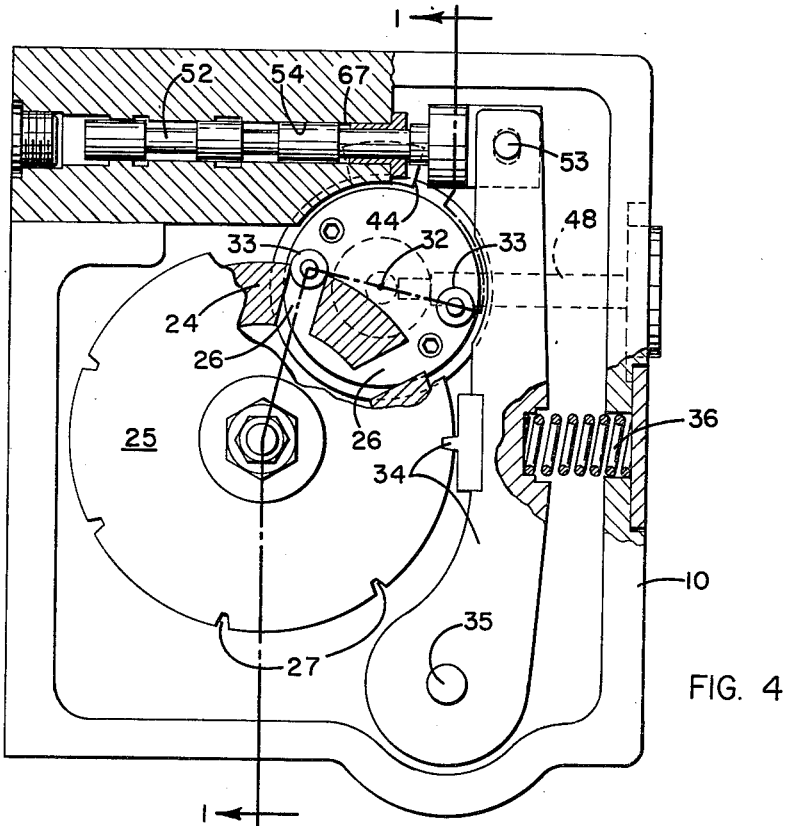
Figure 5:
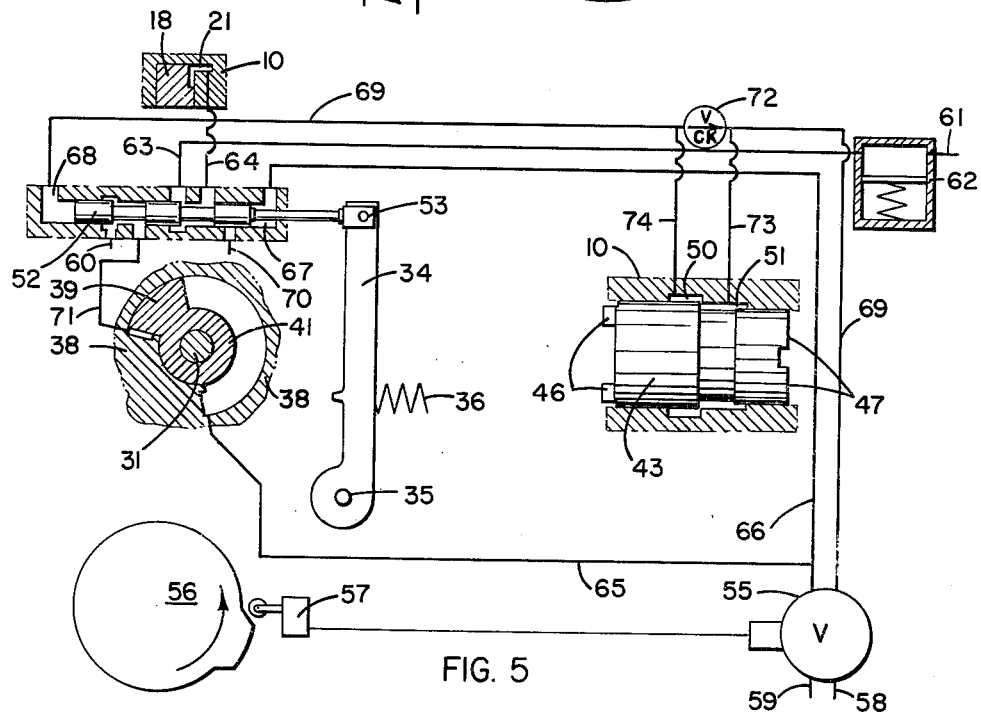

A preferred embodiment of the invention, applied to the work spindle of a gear cutting machine, is shown in the accompanying drawings, wherein:

FIG. 1 is a view primarily in section in the planes, designated 1—1 in FIG. 4, which contain the axes of the driver and the driven wheel;

FIGS. 2 and 3 are detail cross-sectional views approximately in the respective planes designated 2—2 and 3—3 in FIG. 1;

FIG. 4 is a view at right angles to FIG. 1, in the transverse planes there designated 4—4, but with the mechanism in a different phase of its operating cycle; and, FIG. 5 is a schematic view illustrating the fluid pressure control system.

The illustrated mechanism comprises a multi-part housing 10 in which a work spindle is journaled for rotation and limited axial motion on axis 13, the housing including as rigidly connected parts thereof a bearing ring 11 and a frontal ring 12. The spindle is made up of rigidly connected front and rear sections, 14 and 15, which enclose a cylinder chamber containing the actuating piston 16 of a chucking device for a workpiece G, in this case a bevel gear blank. A ball-sleeve bearing 17 supports the front portion of the spindle in bearing ring 11. An annular clamp piston 18 disposed between main housing section 10 and ring 11 is adapted for slight axial motion but is held against rotation by a pin 19. When hydraulic pressure is applied to annular chamber 21 in front of the piston, the surfaces at 22 and 23 are clamped together, thereby transmitting directly to the housing 10, 11 any torque and other loads exerted on the workpiece by a cutting tool. By release of this pressure the spindle is freed for slight axial motion and for work-indexing rotation.

A two-part index driven wheel 24, 25 is rigidly but detachably secured to the back end of the spindle. One part of the wheel, plate 24, is provided with equally spaced radial slots 26 corresponding in number to the teeth to be cut in the workpiece G. The other part, plate 25, has around its periphery the same number of equally spaced notches 27. The index driver comprises a disc 28 rigidly but detachably secured to flange 29 of a shaft 31 whose rotation axis is designated 32. The driver disc 28 carries two diametrically opposed drive pins 33, preferably rollers, adapted for alternate engagement in the radial slots 26. A pawl 34 pivoted to the housing by pin 35 is urged by a spring 36 into engagement with notches 27 for final positioning of the spindle during each indexing cycle.

Shaft 31 is rotated by a hydraulic actuator comprising a vane-type motor whose multi-part housing or stator, designated 38, is rigid with the housing 10 and whose vane piston 39 has its hub, 41, supported for back and forth rotation about axis 32 on bearing rollers 42. As shown in FIG. 5 the vane and stator are so proportioned that the vane will rotate back and forth through an angle of 180°. Shaft 31 is journaled for rotation in the piston hub 41, and has keyed thereon a shuttle 43 which is rotatable and axially movable in a cylinder bore in housing 10. The shuttle is keyed to the shaft, so as to constitute a part of the rotatable shaft assembly, but is axially reciprocable relative to the shaft proper which is held against axial motion by a retainer 44, FIG. 4, on the housing and by a thrust bearing 45, FIG. 1, which engages the opposite faces of flange 29.

As shown in FIGS. 1, 2 and 5, the shuttle has at one end coupling teeth 46 adapted to engage complementary teeth on hub 41 when the shuttle is in its left limit position (in FIG. 1). On its opposite end the shuttle has coupling teeth 47 for straddling engagement with a tooth formation on the inner end of a bar 48, FIGS. 1 and 3, when the shuttle is in its right limit position. The bar is rigidly secured to and in effect is a part of housing 10. When the shuttle is in the limit position wherein teeth 46 are engaged, teeth 47 are disengaged, and when in the opposite limit position, wherein teeth 47 are engaged, teeth 46 are disengaged. But in an intermediate position of the shuttle both teeth 46 and 47 are engaged, so that at no time is the shuttle rotationally free of both the vane piston and the housing 10 (bar 48). A spring 49 urges the shuttle to its right limit position. It is moved to its left limit position by the application of hydraulic pressure to chamber 51.

The shuttle 43 also constitutes a valve for controlling the application of pressure to the motor 38, 39, for the forward stroke thereof, to assure the vane piston 39 being clutched to the driver 28 before this stroke begins. For this purpose the shuttle upon approach to its left limit position uncovers an annular port 50 to the chamber 51.

A piston-valve 52, FIGS. 4 and 5, pivoted to pawl 34 by pin 53, is slidable in a ported bore 54 in housing 10. This piston-valve actuates the pawl and, together with a solenoid-operated reversing valve 55 and the shuttle 43 constitutes the control valve means for the index mechanism. A cam 56 of the gear cutting machine actuates a switch 57 which controls the solenoids of valve 55, to cause indexing to occur at a predetermined point in the operating cycle of the machine. Hydraulic pressure and return lines, 58 and 59 respectively, extend from a suitable pressure source and to a sump associated with the source, a pressure line 61 extends from the source to a mechanical pressure accumulator 62; and return lines 60 and 70 extend from the piston-valve assembly to the sump.

Referring to FIG. 5, when the gear machine is cutting, spring 36 holds the pawl 34 engaged and the piston-valve in its left limit position; pressure from accumulator 62 and hydraulic line 63 is directed by the piston-valve 52 through line 64 to clamp chamber 21; pressure from line 58 is directed by valve 55 through line 65 to hold vane piston 39 in its counterclockwise limit position (in FIGS. 4 and 5) and through line 66 to chamber 67 of the piston-valve assembly to aid spring 36 in holding the pawl 34 seated; the left chamber 68 of the piston-valve assembly is on exhaust through line 69 and valve 55 to return line 59; and the left chamber of the motor 38, 39 is on exhaust through line 71 and the piston-valve assembly to return line 60. When the lobe cam 56 closes switch 57, which occurs after the cutting of one tooth or one tooth slot of the work gear G, the valve 55 is reversed to connect line 69 to pressure line 58 and connect lines 65 and 66 to return line 59. A check valve 72 in line 69 directs pressure through line 73 to annular chamber 51, causing movement of shuttle 43 to the left, thereby coupling driver 28 to vane piston 39. At the end of this motion the shuttle uncovers valve port 50, thereby opening chamber 51 to line 74 which extends to line 69 on the opposite side of the check valve. As a result, pressure is applied to chamber 68, causing movement of the piston-valve 52 to the right, disengaging the pawl 34. As the piston-valve moves to the right, it first closes off line 63 from line 64, then opens the latter to return line 70 so that the clamp piston 18 is released, and then connects line 63 to line 71. This results in application of fluid pressure from accumulator 62 to effect clockwise rotation of the vane piston and driver 28 through 180°, during which the roller 33 at the right in FIG. 4 engages in the adjacent slot 26 of the driven wheel and advances the wheel by one index pitch.

The indexing action may occur very rapidly due to the energy stored in accumulator 62, and is completed before the lobe of cam 56 has passed the switch 57. When this occurs, the switch again causes reversal of valve 55, connecting line 69 to exhaust line 59 and lines 65 and 66 to pressure line 58. Spring 49 immediately moves shuttle 43 to its right limit position, uncoupling driver 28 from the vane piston and coupling it to the housing 10 (bar 48); and spring 36 engages the pawl 34 with plate 25, completing the indexing action of spindle 14, 15. Simultaneously the piston-valve 52 is shifted to its left limit position. Pressure applied through line 66 to chamber 67 aids in this action, fluid exhausting from chamber 68 and line 69 through check valve 72. As the piston-valve moves to the left, line 64 is shut off from return line 70 and connected to line 63, so that pressure is applied to clamp chamber 21; and line 71 is opened to return line 60 so that pressure applied to the right chamber of motor 38, 39 through line 65 returns the vane piston to its counterclockwise limit position. Although the described indexing action is rapid, acceleration loads are relatively small because of the slow-start and slow-stop of spindle rotation which result from the tangential relation of the circular path of the driving pins 33 to the radial direction of the pin-engaged slot 26 in the initial and final phases of indexing.

I claim:

1. An index mechanism comprising a housing, a Geneva driver and radially slotted driven wheel rotatable in the housing about parallel axes, the driver having two diametrically opposed drive pins adapted to alternately engage in wheel slots as the driver rotates, to effect stepwise rotational advance of the wheel, with one such advance for each 180° rotation of the driver, a fluid pressure actuator for the driver including a member rotatable back and forth in the housing through 180° about the axis of the driver, a shuttle reciprocable in the housing along said axis by fluid pressure, the shuttle being connected to the driver for rotation therewith about said axis and having opposed coupling teeth which mate respectively with coupling tooth formations on said member and on the housing, for coupling the shuttle against relative rotation to said member and to the housing, respectively, when the shuttle is in the opposite terminal positions of its reciprocation, and valve means arranged to control fluid pressure to the actuator and to the shuttle in a manner to cause the strokes of reversing rotation of said member to alternate with strokes of reciprocation of the shuttle, to thereby effect intermittent unidirectional rotation of the driver through increments of 180°.

2. A mechanism according to claim 1 in which said coupling teeth and coupling tooth formations are so proportioned that during its reciprocation the shuttle is coupled to said member before being uncoupled from the housing, and vice versa.

3. A mechanism according to claim 1 in which said valve means comprises a port covered and uncovered by said shuttle, respectively to prevent and enable application of pressure to the actuator for the driven wheel advancing stroke thereof, said port being uncovered by said shuttle only in the terminal position of the latter wherein it is coupled to said member.

4. A mechanism according to claim 1 in which there is a pawl supported by the housing and engageable in locating notches in said driven wheel to determine the indexed positions of the latter, and in which said valve means comprise a piston-valve for controlling said fluid pressure actuator, said piston-valve being mechanically connected to said pawl for operating the same and being so arranged as to effect disengagement of the pawl before causing the wheel advancing stroke of the actuator and to effect engagement of the pawl before causing the return stroke of the actuator.

5. A mechanism according to claim 4 in which said wheel is secured to a spindle journaled in the housing for rotation and limited axial motion, there is an axially expansible fluid operable clamp for clamping the spindle to the housing, and said piston-valve is arranged to so control the clamp as to effect clamping of the spindle upon engagement of the pawl and unclamping of the spindle substantially simultaneously with pawl disengagement.

References Cited by the Examiner

UNITED STATES PATENTS

| | | | |
|---|---|---|---|
| 912,124 | 2/09 | Hanson | 74—822 |
| 2,188,996 | 2/40 | Carlsen | 74—822 X |
| 2,307,176 | 1/43 | Witte | 74—436 |
| 2,605,647 | 8/52 | Duvoisin | 74—436 |
| 3,093,014 | 6/63 | Graf | 74—822 |
| 3,136,168 | 6/64 | Matovich | 74—820 X |

BROUGHTON G. DURHAM, *Primary Examiner.*